(12) United States Patent
Wasserman et al.

(10) Patent No.: US 7,752,100 B1
(45) Date of Patent: Jul. 6, 2010

(54) SELECTOR FUNCTION FOR LIFE-TIME VALUE FINANCIAL PROCESSING IN A RELATIONAL DATABASE MANAGEMENT SYSTEM

(75) Inventors: Brian J. Wasserman, Escondido, CA (US); Richard C. Schwarz, San Marcos, CA (US); Thomas K. Ryan, Valley Center, CA (US)

(73) Assignee: Terodata US, Inc., Miamisburg, OH (US)

( * ) Notice: Subject to any disclaimer, the term of this patent is extended or adjusted under 35 U.S.C. 154(b) by 1365 days.

(21) Appl. No.: 10/644,422

(22) Filed: Aug. 20, 2003

Related U.S. Application Data

(63) Continuation-in-part of application No. 10/227,909, filed on Aug. 26, 2002, and a continuation-in-part of application No. 10/227,726, filed on Aug. 26, 2002, and a continuation-in-part of application No. 10/228,031, filed on Aug. 26, 2002, now Pat. No. 7,418,415, and a continuation-in-part of application No. 10/227,976, filed on Aug. 26, 2002, and a continuation-in-part of application No. 10/228,022, filed on Aug. 26, 2002, and a continuation-in-part of application No. 10/016,779, filed on Dec. 10, 2001, now Pat. No. 7,249,138, which is a continuation-in-part of application No. 10/013,422, filed on Dec. 10, 2001, which is a continuation-in-part of application No. 10/013,434, filed on Dec. 10, 2001, which is a continuation-in-part of application No. 10/016,452, filed on Dec. 10, 2001, which is a continuation-in-part of application No. 09/845,461, filed on Apr. 30, 2001, which is a continuation-in-part of application No. 09/845,924, filed on Apr. 30, 2001, which is a continuation-in-part of application No. 09/845,851, filed on Apr. 30, 2001, which is a continuation-in-part of application No. 09/608,355, filed on Jun. 29, 2000, said application No. 10/644,422 is a continuation-in-part of application No. 09/943,060, filed on Aug. 30, 2001, and a continuation-in-part of application No. 09/943,059, filed on Aug. 30, 2001, and a continuation-in-part of application No. 09/610, 646, filed on Jun. 29, 2000, and a continuation-in-part of application No. 09/608,681, filed on Jun. 29, 2000, and a continuation-in-part of application No. 09/608,675, filed on Jun. 29, 2000, and a continuation-in-part of application No. 09/608,342, filed on Jun. 29, 2000, and a continuation-in-part of application No. 09/608,682, filed on Jun. 29, 2000.

(60) Provisional application No. 60/253,281, filed on Nov. 27, 2000, provisional application No. 60/253,254, filed on Nov. 27, 2000.

(51) Int. Cl.
*G06Q 40/00* (2006.01)
(52) U.S. Cl. ........................................ 705/35
(58) Field of Classification Search .................. 705/35
See application file for complete search history.

(56) References Cited

U.S. PATENT DOCUMENTS 5,189,608 A    2/1993   Lyons et al.
(Continued)

OTHER PUBLICATIONS

Kassing, Jay, "Profitability: Growing the Bottom Line," CSI, 1999, 43 pages.
(Continued)

*Primary Examiner*—Stefanos Karmis
*Assistant Examiner*—Jessica L Lemieux
(74) *Attorney, Agent, or Firm*—Gates & Cooper LLP

(57) ABSTRACT

A Life-Time Value system is a data-driven computer-facilitated financial model that provides accurate and consistent profitability projections using current period account level profitability data stored in a Relational Database Management System. The Life-Time Value system performs Net Present Value and Future Value calculations using accounts, amounts and rates retrieved from the Relational Database Management System by a Selector function using selection criteria specified by one or more rules. The results from the Net Present Value and Future Value calculations are integrated to provide a Life-Time Value of one or more customers.

27 Claims, 3 Drawing Sheets

U.S. PATENT DOCUMENTS

| | | | |
|---|---|---|---|
| 5,249,120 A | | 9/1993 | Foley |
| 5,551,027 A | * | 8/1996 | Choy et al. ................. 707/201 |
| 5,615,109 A | | 3/1997 | Eder |
| 5,655,085 A | | 8/1997 | Ryan et al. |
| 5,712,987 A | | 1/1998 | Waits et al. |
| 5,721,831 A | | 2/1998 | Waits et al. |
| 5,819,237 A | | 10/1998 | Garman |
| 5,852,811 A | * | 12/1998 | Atkins ..................... 705/36 R |
| 5,911,135 A | | 6/1999 | Atkins |
| 5,963,939 A | * | 10/1999 | McCann et al. ................. 707/4 |
| 5,991,743 A | | 11/1999 | Irving et al. |
| 6,026,382 A | | 2/2000 | Kalthoff |
| 6,085,175 A | | 7/2000 | Gugel et al. |
| 6,233,566 B1 | | 5/2001 | Levine et al. |
| 6,240,399 B1 | | 5/2001 | Frank et al. |
| 6,253,192 B1 | | 6/2001 | Corlett et al. |
| 6,275,813 B1 | | 8/2001 | Berka |
| 6,292,787 B1 | | 9/2001 | Scott et al. |
| 6,360,210 B1 | | 3/2002 | Wallman |
| 6,393,406 B1 | | 5/2002 | Eder |
| 6,405,189 B1 | * | 6/2002 | Gillis ............................ 707/3 |
| 6,625,624 B1 | * | 9/2003 | Chen et al. .................. 707/204 |
| 7,082,411 B2 | * | 7/2006 | Johnson et al. ................ 705/37 |
| 7,249,138 B1 | * | 7/2007 | Wasserman ................. 707/102 |
| 2002/0026394 A1 | | 2/2002 | Savage et al. |
| 2003/0147552 A1 | * | 8/2003 | Foran et al. ................. 382/128 |
| 2004/0039688 A1 | * | 2/2004 | Sulkowski et al. ............ 705/38 |

OTHER PUBLICATIONS

"Canadian Bank Mines for Data-based Gold," Action Items, Dec. 2, 1997, 2 pages.

"Bank of Ireland Selects Compaq AlphaServers to help Improve Profitability Management," Dec. 3, 1998, Compaq, 2 pages.

"Marquis Tops 300 MCIF-CRM Data Mart Clients Worldwide," Apr. 18, 2000, 2 pages.

Curley, Bob, "Royal Bank unearths profitability solution", Bank Systems & Technology, Apr. 2000, 2 pages.

* cited by examiner

SELECTOR FUNCTION FOR LIFE-TIME VALUE FINANCIAL PROCESSING IN A RELATIONAL DATABASE MANAGEMENT SYSTEM

CROSS REFERENCE TO RELATED APPLICATIONS

This application is related to the following co-pending and commonly assigned patent applications:

Utility application Ser. No. 10/644,131, filed on Aug. 20, 2003, by Peter H. Redweik, entitled "LIFE-TIME VALUE FINANCIAL PROCESSING IN A RELATIONAL DATABASE MANAGEMENT SYSTEM,"

Utility application Ser. No. 10/644,110, filed on Aug. 20, 2003, by Peter H. Redweik, entitled "NET PRESENT VALUE FORECAST FOR LIFE-TIME VALUE FINANCIAL PROCESSING IN A RELATIONAL DATABASE MANAGEMENT SYSTEM,"

Utility application Ser. No. 10/644,169, filed on Aug. 20, 2003, by Peter H. Redweik, entitled "NET PRESENT VALUE ATTRITION FOR LIFE-TIME VALUE FINANCIAL PROCESSING IN A RELATIONAL DATABASE MANAGEMENT SYSTEM,"

Utility application Ser. No. 10/644,171, filed on Aug. 20, 2003, by Peter H. Redweik, entitled "FUTURE VALUE PROPENSITY FOR LIFE-TIME VALUE FINANCIAL PROCESSING IN A RELATIONAL DATABASE MANAGEMENT SYSTEM," and Utility application Ser. No. 10/644,421, filed on Aug. 20, 2003, by Peter H. Redweik, entitled "FUTURE VALUE ATTRITION FOR LIFE-TIME VALUE FINANCIAL PROCESSING IN A RELATIONAL DATABASE MANAGEMENT SYSTEM,"

all of which applications are incorporated by reference herein.

This application is a continuation-in-part of the following co-pending and commonly assigned patent applications:

Utility application Ser. No. 10/227,909, filed on Aug. 26, 2002, by Brian J. Wasserman and Thomas K. Ryan, entitled "PLATFORM INDEPENDENT ARCHITECTURE FOR FINANCIAL PROCESSING IN A RELATIONAL DATABASE MANAGEMENT SYSTEM,"

Utility application Ser. No. 10/227,726, filed on Aug. 26, 2002, by Richard C. Schwarz, Brian J. Wasserman, Sang Y. Yum and Thomas K. Ryan, entitled "DRIVER AMOUNT/COUNT SELECTION FOR FINANCIAL PROCESSING IN A RELATIONAL DATABASE MANAGEMENT SYSTEM,"

Utility application Ser. No. 10/228,031, filed on Aug. 26, 2002, now U.S. Pat. No. 7,418,415, by Brian J. Wasserman, entitled "OBJECT-ORIENTED REPRESENTATION OF A GENERIC PROFITABILITY RULE FOR FINANCIAL PROCESSING IN A RELATIONAL DATABASE MANAGEMENT SYSTEM,"

Utility application Ser. No. 10/227,976, filed on Aug. 26, 2002, by Brian J. Wasserman, George R. Hood and Thomas K. Ryan, entitled "DISCRETE PROFITABILITY CALCULATIONS FOR FINANCIAL PROCESSING IN A RELATIONAL DATABASE MANAGEMENT SYSTEM,"

Utility application Ser. No. 10/228,022, filed on Aug. 26, 2002, by Brian J. Wasserman, George R. Hood and Thomas K. Ryan, entitled "RULES-BASED, DATA-DRIVEN PROFITABILITY CALCULATIONS FOR FINANCIAL PROCESSING IN A RELATIONAL DATABASE MANAGEMENT SYSTEM,"

Utility application Ser. No. 10/016,779, filed on Dec. 10, 2001, now U.S. Pat. No. 7,249,138, by Brian J. Wasserman, entitled "PARALLEL SELECTION PROCESSING FOR FINANCIAL PROCESSING IN A RELATIONAL DATABASE MANAGEMENT SYSTEM," which is a continuation-in-part of the applications listed herein that are identified by Ser. No. 10/013,422, Ser. No. 10/013,434, and Ser. No. 10/016,452;

Utility application Ser. No. 10/013,422, filed on Dec. 10, 2001, by Brian J. Wasserman, entitled "ACCOUNT SELECTION FOR FINANCIAL PROCESSING IN A RELATIONAL DATABASE MANAGEMENT SYSTEM," which is a continuation-in-part of the applications listed herein that are identified by Ser. No. 10/016,779, Ser. No. 10/013,434, and Ser. No. 10/016,452;

Utility application Ser. No. 10/013,434, filed on Dec. 10, 2001, by Brian J. Wasserman, entitled "DRIVER AMOUNT AND COUNT SELECTION PROCESSING FOR FINANCIAL PROCESSING IN A RELATIONAL DATABASE MANAGEMENT SYSTEM," which is a continuation-in-part of the applications listed herein that are identified by Ser. No. 10/016,779, Ser. No. 10/013,422, and Ser. No. 10/016,452; and Utility application Ser. No. 10/016,452, filed on Dec. 10, 2001, by Brian J. Wasserman, George R. Hood, and Thomas K. Ryan, entitled "DYNAMIC EVENT SELECTION FOR FINANCIAL PROCESSING IN A RELATIONAL DATABASE MANAGEMENT SYSTEM," which is a continuation-in-part of the applications listed herein that are identified by Ser. No. 10/016,779, Ser. No. 10/013,422, Ser. No. 10/013,434, Ser. No. 09/845,461, Ser. No. 09/845,924, Ser. No. 09/845,851, Ser. No. 09/608,355 filed Jun. 29, 2000, Ser. No. 09/610,646, filed Jun. 29, 2000 Ser. No. 09/608,681, filed Jun. 29, 2000 Ser. No. 09/608,675, filed Jun. 29, 2000 Ser. No. 09/608,342, filed Jun. 29, 2000 and Ser. No. 09/608,682 filed Jun. 29, 2000;

all of which applications are incorporated by reference herein.

This application is related to the following co-pending and commonly assigned patent applications:

Utility application Ser. No. 09/845,461, filed on Apr. 30, 2001, by George R. Hood, entitled "TAX ADJUSTMENT FOR FINANCIAL PROCESSING IN A RELATIONAL DATABASE MANAGEMENT SYSTEM," which is a continuation-in-part of the applications listed herein that are identified by Ser. No. 09/608,355, Ser. No. 09/610,646, Ser. No. 09/608,681, Ser. No. 09/608,675, Ser. No. 09/608,342, and Ser. No. 09/608,682;

Utility application Ser. No. 09/845,924, filed on Apr. 30, 2001, by George R. Hood, entitled "AMORTIZATION FOR FINANCIAL PROCESSING IN A RELATIONAL DATABASE MANAGEMENT SYSTEM," which is a continuation-in-part of the applications listed herein that are identified by Ser. No. 09/608,355, Ser. No. 09/610,646, Ser. No. 09/608,681, Ser. No. 09/608,675, Ser. No. 09/608,342, and Ser. No. 09/608,682;

Utility application Ser. No. 09/845,851, filed on Apr. 30, 2001, by George R. Hood, entitled "SHAREHOLDER VALUE ADD FOR FINANCIAL PROCESSING IN A RELATIONAL DATABASE MANAGEMENT SYSTEM," which is a continuation-in-part of the applications listed herein that are identified by Ser. No. 09/608,355, Ser. No. 09/610,646, Ser. No. 09/608,681, Ser. No. 09/608,675, Ser. No. 09/608,342, and Ser. No. 09/608,682;

Utility application Ser. No. 09/608,355, filed on Jun. 29, 2000, by George R. Hood and Paul H. Phibbs, Jr., entitled "ADVANCED AND BREAKTHROUGH NET INTEREST REVENUE IMPLEMENTATION FOR FINANCIAL PROCESSING IN A RELATIONAL DATABASE MANAGEMENT SYSTEM,"

Utility application Ser. No. 09/610,646, filed on Jun. 29, 2000, by George R. Hood and Paul H. Phibbs, Jr., entitled "BASIC AND INTERMEDIATE NET INTEREST REVENUE IMPLEMENTATION FOR FINANCIAL PROCESSING IN A RELATIONAL DATABASE MANAGEMENT SYSTEM,"

Utility application Ser. No. 09/608,681, filed on Jun. 29, 2000, by George R. Hood, entitled "OTHER REVENUE IMPLEMENTATION FOR FINANCIAL PROCESSING IN A RELATIONAL DATABASE MANAGEMENT SYSTEM,"

Utility application Ser. No. 09/608,675, filed on Jun. 29, 2000, by George R. Hood, entitled "DIRECT EXPENSE IMPLEMENTATION FOR FINANCIAL PROCESSING IN A RELATIONAL DATABASE MANAGEMENT SYSTEM,"

Utility application Ser. No. 09/608,342, filed on Jun. 29, 2000, by George R. Hood, entitled "INDIRECT EXPENSE IMPLEMENTATION FOR FINANCIAL PROCESSING IN A RELATIONAL DATABASE MANAGEMENT SYSTEM,"

Utility application Ser. No. 09/608,682, filed on Jun. 29, 2000, by George R. Hood, entitled "RISK PROVISION IMPLEMENTATION FOR FINANCIAL PROCESSING IN A RELATIONAL DATABASE MANAGEMENT SYSTEM,"

all of which applications are incorporated by reference herein.

This application is related to the following co-pending and commonly assigned patent applications:

Utility application Ser. No. 09/943,060, filed on Aug. 30, 2001, by Paul H. Phibbs, Jr., entitled "CAPITAL ALLOCATION IN A NET INTEREST REVENUE IMPLEMENTATION FOR FINANCIAL PROCESSING IN A RELATIONAL DATABASE MANAGEMENT SYSTEM," which claims the benefit under 35 U.S.C. §119(e) to Provisional Application Ser. No. 60/253,281, filed Nov. 27, 2000, by Paul H. Phibbs, Jr., entitled "CAPITAL ALLOCATION IN A NET INTEREST REVENUE IMPLEMENTATION FOR FINANCIAL PROCESSING IN A RELATIONAL DATABASE MANAGEMENT SYSTEM," and Provisional Application Ser. No. 60/253,254, filed Nov. 27, 2000, by Paul H. Phibbs, Jr., entitled "ALLOCATED BALANCES IN A NET INTEREST REVENUE IMPLEMENTATION FOR FINANCIAL PROCESSING IN A RELATIONAL DATABASE MANAGEMENT SYSTEM," and which is a continuation-in-part of the applications listed herein that are identified by Ser. No. 09/608,355 and Ser. No. 09/610,646;

Utility application Ser. No. 09/943,059, filed on Aug. 30, 2001, by Paul H. Phibbs, Jr., entitled "ALLOCATED BALANCES IN A NET INTEREST REVENUE IMPLEMENTATION FOR FINANCIAL PROCESSING IN A RELATIONAL DATABASE MANAGEMENT SYSTEM," which claims the benefit under 35 U.S.C. §119(e) to Provisional Application Ser. No. 60/253,254, filed Nov. 27, 2000, by Paul H. Phibbs, Jr., entitled "ALLOCATED BALANCES IN A NET INTEREST REVENUE IMPLEMENTATION FOR FINANCIAL PROCESSING IN A RELATIONAL DATABASE MANAGEMENT SYSTEM," and Provisional Application Ser. No. 60/253,281, filed Nov. 27, 2000, by Paul H. Phibbs, Jr., entitled "CAPITAL ALLOCATION IN A NET INTEREST REVENUE IMPLEMENTATION FOR FINANCIAL PROCESSING IN A RELATIONAL DATABASE MANAGEMENT SYSTEM," and which is a continuation-in-part of the applications listed herein that are identified by Ser. No. 09/608,355 and Ser. No. 09/610,646;

both of which applications are incorporated by reference herein.

BACKGROUND OF THE INVENTION

1. Field of the Invention

This invention relates in general to financial processing systems performed by computers, and in particular, to a selector function for life-time value financial processing using data accessed from a relational database management system.

2. Description of Related Art

Operating a business on current financials is a critical first step towards success. However, for sustained long-term growth and profitability, businesses must look beyond traditional profit and loss statements and current value measurements. Instead, businesses need to develop a clear calculation of the life-time value of every facet of the company's business, from customers and products to delivery channels. However, there are few tools available for performing theses tasks.

The present invention, known as the Life-Time Value (LTV) system, satisfies these needs. The Life-Time Value system brings together the results and trends of a company's financial information, such as the measurements used to determine current profitability, and blends them with the future metrics, such as propensities, attrition rates and growth values. Using the Life-Time Value system, businesses can perform a number of analyses.

In the area of marketing, the Life-Time Value system can be used to identify long-term targets, optimize customer mix, attract, retain and maintain profitable customer relationships, and design intelligent offers targeted to specific customers. In the area of distribution, the Life-Time Value system can be used to understand channel life-time value, and enhance customer servicing, relationship management and migration. In the area of finance, the Life-Time Value system can be used to substantiate pricing and revenue mix, and rationalize cost and expense justification. In the area of product management, the Life-Time Value system can be used to provide sophisticated product design, pricing and relationships, and develop cutting-edge, future product and testing. In the area of risk management, the Life-Time Value system can be used to incorporate future exposures, hedges and fluctuations.

SUMMARY OF THE INVENTION

A Life-Time Value system is a data-driven computer-facilitated financial model that provides accurate and consistent profitability projections using current period account level profitability data stored in a Relational Database Management System. The Life-Time Value system performs Net Present Value and Future Value calculations using accounts, amounts and rates retrieved from the Relational Database Management System by a Selector function using selection criteria specified by one or more rules. The results from the Net Present Value and Future Value calculations are integrated to provide a Life-Time Value of one or more customers.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The Life-Time Value (LTV) system is a data-driven computer-facilitated financial modeling system that provides accurate and consistent profitability projections using current period account level profitability data stored in a Relational Database Management System (RDBMS). The LTV system performs Net Present Value (NPV) and Future Value (FV) processing using business-rule and data-driven applications that embrace current period profit components, defines forecast periods, parameters and methodologies, and applies appropriate growth values, attrition values and propensity values to a life-time value object.

Hardware and Software Environment

Figure 1:
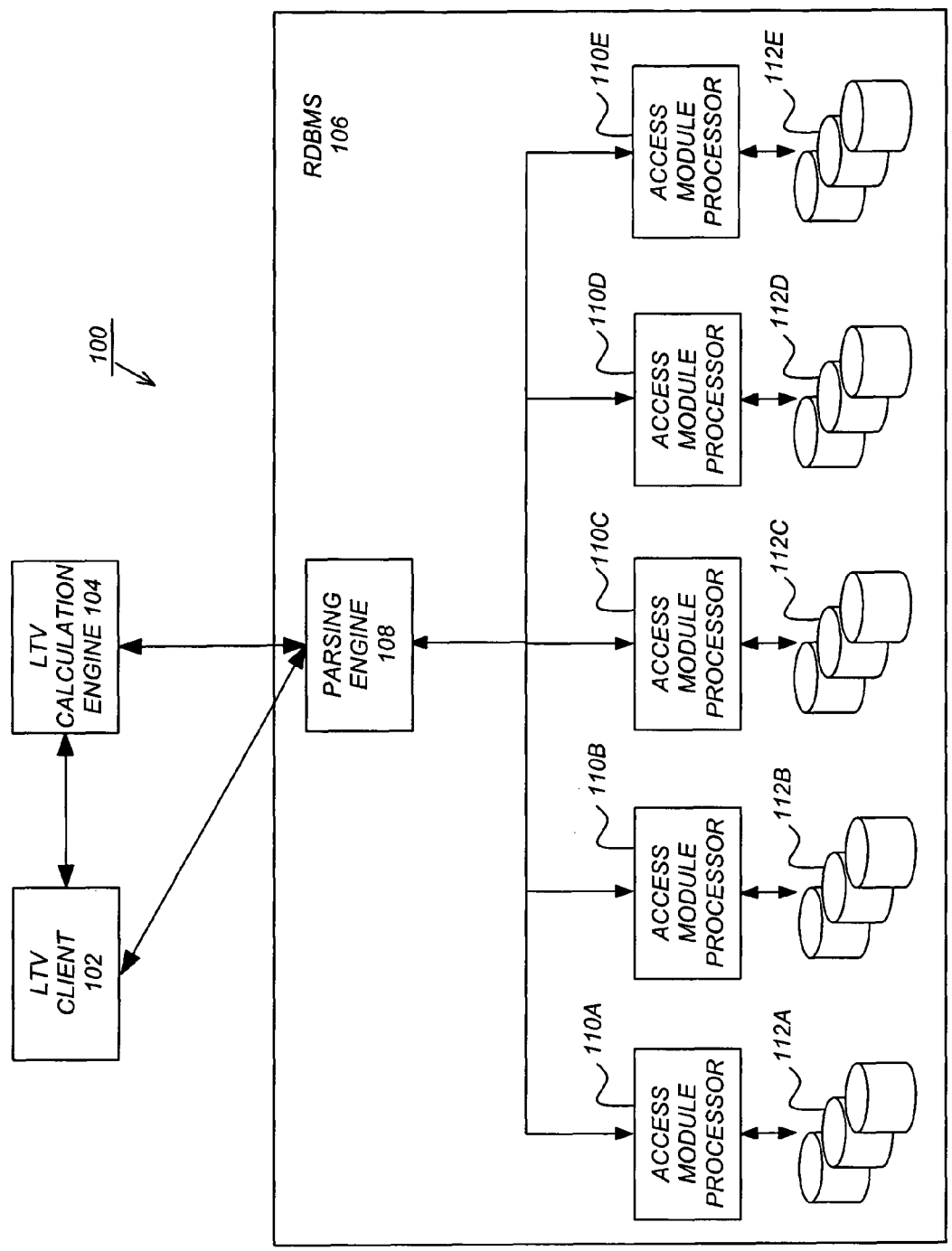
FIG. 1 illustrates an exemplary hardware and software environment according to the preferred embodiment of the present invention.

FIG. 1 illustrates an exemplary hardware and software environment according to the preferred embodiment of the present invention. In the exemplary environment, a computer system implements the LTV system 100 in a three-tier client-server architecture, wherein the first or client tier provides an LTV Value Client 102 that may include, inter alia, a graphical user interface (GUI), the second or middle tier provides an LTV Calculation Engine 104 for performing functions as described later in this application, and the third or server tier comprises an RDBMS 106 that stores data and metadata in a relational database. The first, second, and third tiers may be implemented in separate machines, or may be implemented as separate or related processes in a single machine.

In the preferred embodiment, the RDBMS 106 includes at least one Parsing Engine (PE) 108 and one or more Access Module Processors (AMPs) 110A-110E storing the relational database in one or more data storage devices 112A-112E. The Parsing Engine 108 and Access Module Processors 110 may be implemented in separate machines, or may be implemented as separate or related processes in a single machine. The RDBMS 106 used in the preferred embodiment comprises the Teradata® RDBMS sold by NCR Corporation, the assignee of the present invention, although other DBMS's could be used.

Generally, the LTV Client 102 includes a graphical user interface (GUI) for operators of the system 100, wherein requests are transmitted to the LTV Calculation Engine 104 and/or the RDBMS 106, and responses are received therefrom. In response to the requests, the LTV Calculation Engine 104 performs the functions described below, including formulating queries for the RDBMS 106 and processing data retrieved from the RDBMS 106. Moreover, the results from the functions performed by the LTV Calculation Engine 104 may be provided directly to the LTV Client 102 or may be provided to the RDBMS 106 for storing into the relational database. Once stored in the relational database, the results from the functions performed by the LTV Calculation Engine 104 may be independently retrieved from the RDBMS 106 by the LTV Client 102 or another system.

Note that the LTV Client 102, the LTV Calculation Engine 104, and the RDBMS 106 may be implemented in separate machines, or may be implemented as separate or related processes in a single machine. Moreover, in the preferred embodiment, the system 100 may use any number of different parallelism mechanisms to take advantage of the parallelism offered by the multiple tier architecture, the client-server structure of the Life-Time Value Client 102, Life-Time Value Calculation Engine 104, and RDBMS 106, and the multiple Access Module Processors 110 of the RDBMS 106. Further, data within the relational database may be partitioned across multiple data storage devices 112 to provide additional parallelism.

Generally, the Life-Time Value Client 102, Life-Time Value Calculation Engine 104, RDBMS 106, Parsing Engine 108, and/or Access Module Processors 110A-110E comprise logic and/or data tangibly embodied in and/or accessible from a device, media, carrier, or signal.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Life-Time Value Operation

Figure 2:
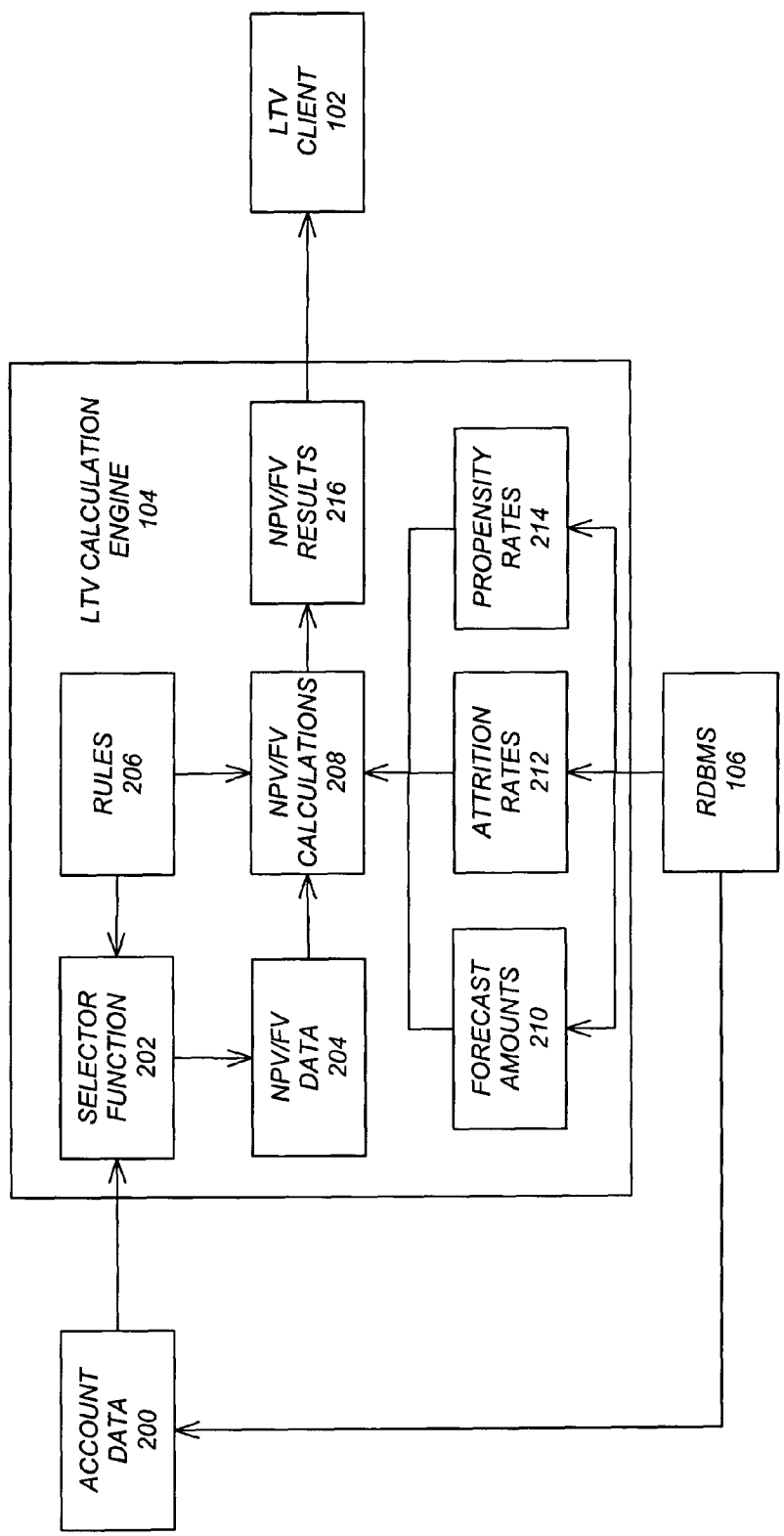
FIG. 2 is a data flow diagram that illustrates the operation of the Life-Time Value system according to the preferred embodiment of the present invention.

FIG. 2 is a conceptual data flow diagram that illustrates the operations of the LTV system 100 performed by the preferred embodiment of the present invention.

The life-time value of a customer is estimated by calculating the net present profitability value of the customer's already purchased products, as well as estimating the possible future profitability value of products the customer may buy in the future. In this context, the net present profitability value of the current product set is referred to as the Net Present Value (NPV) and the possible future profitability value is referred to as the Future Value (FV). The NPV and FV are used to give the user an indication of the life-time value of the customer.

To calculate the NPV and FV of the customer, the LTV system 100 integrates existing account data along with basic assumptions about behavior and valuations to calculate the NPV and FV for each customer. One of the basic requirements for the NPV and FV calculations is to obtain the current profitability value of the accounts for each customer.

In FIG. 2, the RDBMS 106 stores detailed information on the current profitability value of the accounts for each customer. Specifically, the RDBMS 106 provides account data 200 for use by the Life-Time Value system 100. A Selector function 202 of the LTV Calculation Engine 104 selects from this account data 200 to create the NPV/FV data 204, based on selection criteria that is specified by user input or one or more Rules 206.

The LTV Calculation Engine 104 performs one or more NPV/FV Calculations 208 on the NPV/FV data 204, based on the Rules 206, as well as Forecast Amounts 210, Attrition Rates 212 and Propensity Rates 214 accessed from the RDBMS 106 and/or otherwise defined by the user. The NPV/FV results 216 from these NPV/FV Calculations 208 provide an indication to the user of the potential profitability value of each customer. The NPV/FV results 216 can then be sent the LTV Client 102, or other systems, as desired.

Selector Function

The Selector function 202 dynamically generates SQL statements to select accounts from the account data 200, as well as to select the Forecast Amounts 210, Attrition Rates 212 and Propensity Rates 214 via the RDBMS 106. The selection criteria used by the Selector function 202 is specified by the Rules 206 and/or user input, and the selection criteria used will differ among the various Rules 206, as described in more detail below:

NPV Forecast Rules—NPV Forecast Rules are used to select a set of Forecast Amounts 210 for a specific set of accounts selected from the account data 200. Forecast Rules contain two sets of selection criteria. The first set selects a set of target accounts from the account data 200 to which the Forecast Rule will be applied. The second set contains a set of Forecast Criteria Groups that are used to select Forecast Amounts 210 that meet the selection criteria.

NPV Attrition Rules—NPV Attrition Rules are used to select a set of Attrition Rates 212 for a specific set of accounts from the account data 200. NPV Attrition Rules contain two sets of selection criteria. The first set selects a set of target accounts from the account data 200 to which the NPV Attrition Rule will be applied. The second election set contains a set of NPV Attrition Rate Criteria Groups that are used to select Attrition Rates 212 that meet the selection criteria.

FV Propensity Rules—FV Propensity Rules are used to select a set of Propensity Rates 216 for a specific set of accounts from the account data 200. FV Propensity Rules contain two sets of selection criteria. The first set selects a set of target accounts from the account data 200 to which the FV Propensity Rule will be applied. The second set contains a set of FV Propensity Rate Criteria Groups that are used to select Propensity Rates 214 that meet the selection criteria.

FV Attrition Rules—FV Attrition Rules are used to select a set of Attrition Rates 212 for a specific set of accounts from the account data 200. FV Attrition Rules contain two sets of selection criteria. The first set selects a set of target accounts from the account data 200 to which the FV Attrition Rule will be applied. The second set contains a set of FV Attrition Rate Criteria Groups that are used to select Attrition Rates 212 that meet the selection criteria.

The selection criteria may comprise attributes, predicates, operators and/or functions, wherein a group of accounts, amounts or rates that satisfy the selection criteria comprise partitions. For example, it is possible to compare an account, amount or rate attribute (i.e., a column) to another account, amount or rate attribute, a literal value, or a domain value (which is an indirect reference to a literal value that is resolved by a lookup function). Operators may include any number of different relational operators, i.e., =, >=, <=, <, >, BETWEEN, etc., and functions may comprise aggregations or other functions.

Using the selection criteria, the Selector function 202 dynamically generates SQL statements to select the proper account data 200, and to aggregate the appropriate account data 200. Moreover, the Selector function 202 optimizes the dynamic generation of the SQL statements, so that multiple selection predicates can be processed in parallel by the RDBMS 106.

The Selector function 202 uses one or more object-oriented parameterized templates to dynamically generate the SQL statements for selecting the accounts, amounts and rates from the relational database. The object-oriented parameterized template is represented by a C++ class hierarchy that contains all the core source code to generate any of the required SQL queries, and that can generate SQL macros as needed. Moreover, the object-oriented parameterized template can be modified by subclassing with inheritance and then customizing the subclasses.

The object-oriented parameterized template typically comprises a join of (potentially) multiple tables within the relational database to a constraint table (storing the selection criteria) and an in-list table (storing IN clauses for the SQL templates). Both the constraint and in-list tables are created and populated from the selection criteria.

Specifically, there are several very important steps in generating the SQL statements:

Substantially similar selection criteria are grouped in order to combine them into one account-partitioning set of SQL statements. In this context, "similar" does not necessarily mean identical, e.g., certain selection criteria are considered identical for the grouping function and are later altered to match the original SQL statements.

Once the selection criteria are grouped, it is necessary to convert and/or combine some of the selection criteria in order to ensure that every selection criteria can be expressed in the fewest number of templates.

One or more constraint tables are created and populated for each group of selection criteria.

One or more in-list tables are created and populated for all groups of selection criteria.

For the purpose of grouping selection criteria, the Selector function 202 treats the relational operators, e.g., =, <, >, =>, <=, as equivalent to a BETWEEN operation. In fact, the Selector function 202 converts these relational operators into an equivalent BETWEEN operation according to the mappings in the following table:

| Operator | Maps to | BETWEEN | Left Value | AND | Right Value |
|---|---|---|---|---|---|
| =X | Maps to | BETWEEN | X | AND | X |
| <X | Maps to | BETWEEN | MIN(X) | AND | LOWER(X) |
| <=X | Maps to | BETWEEN | MIN(X) | AND | X |
| >X | Maps to | BETWEEN | HIGHER(X) | AND | MAX(X) |
| >=X | Maps to | BETWEEN | X | AND | MAX(X) | wherein:

MAX(X) is the maximum value of X in the domain of its data type. For example, if X is a BYTEINT value, then the maximum value of X is 127.

MIN(X) is the minimum value of X in the domain of its data type. For example, if X is a BYTEINT value, then the minimum value of X is −128.

LOWER(X) is the next lowest value of X in the domain of its data type. For example, if X is a BYTEINT value, then the next lower value of X is 'X−1' (unless X is already −128).

HIGHER(X) is the next greater value of X in the domain of its data type. For example, if X is a BYTEINT value, then the next greater value of X is 'X+1' (unless X is already 127).

If the relational operator in the selection criteria is of the type '>=', '<=', '>', or '<', then there may exist another selection criteria within the group of selection criteria that matches, i.e., that would form a valid BETWEEN operation. To match first and second selection criteria, the first and second selection criteria must be the same attribute, and if the relational operator of the first selection criteria is either '>=' or '>', then it will match either '<=' or '<' in the second selection criteria. Likewise, if the relational operator of the first selection criteria is '<=' or '<', then it will match either '>=' or '>' in the second selection criteria.

Once a matching pair of first and second selection criteria is found, the combination into one BETWEEN operation is straightforward. It is worth noting that, just as in the simple case, '<X' results in 'BETWEEN Y AND LOWER(X)' and '>X' results in 'BETWEEN HIGHER(X) and Y'.

As noted above, the Selector function 202 optimizes the dynamic generation of SQL statements, so that multiple selection criteria can be processed in parallel by the RDBMS 106. Generally, this requires an understanding of the operation of the Parsing Engine 108 of the RDBMS 106, and how it transforms SQL statements into an operator tree that, in turn, can be used to generate multiple, parallelized access plans for execution by Access Module Processors 110A-E of the RDBMS 106.

In generating the SQL statements, the Selector function 202 groups multiple sets of selection criteria together and processes the groups in parallel to the extent possible, and generates several sets of output tables. The goal is to process similar selection criteria together at the same time, so that fewer passes need to be made through the tables in the relational database.

This step is necessary because the NPV/FV Calculations 208 are scripts that operate against known, statically defined, tables. In the LTV system 100, the specification of selection criteria, and the attributes that can be used in the Selector function 202, are completely dynamic and user-driven. There is no way for the scripts to contain this knowledge, nor can it be predefined as part of the scripts.

When grouping selection criteria, the following is required:

The selection criteria has to be applied to the same level of accounts. amounts or rates.

That each of the selection criteria are of the same types of selection criteria.

That each of the selection criteria access the same attributes or columns. Note that an alternative embodiment would only require that each of the selection criteria access the same table.

Using the above, each distinct group of selection criteria can be processed independently. This allows the Selector function 202 to process each distinct group of selection criteria in parallel. In this context, a partition is a set of one or more accounts that satisfy one or more selection criteria, in order to apply costs and revenues to each account.

In the preferred embodiment, the Selector function 202 optimizes the SQL statements that are dynamically generated based on the specified selection criteria. The basic principles of this optimization are:

Satisfy the selection criteria using as few SQL statements as possible, and

Generate SQL statements that can be executed in parallel by the RDBMS 106.

Two features of the RDBMS 106 motivate the method chosen for optimization. First, it is assumed that every SQL statement that partitions accounts, amounts or rates needs to perform a full file scan of one or more tables in the relational database. A full file scan reads every single row of a table and, since it is assumed that the tables are distributed evenly across all AMPs 110A-E in the RDBMS 106, it therefore means that every AMP 110A-E uses one worker task to read the rows to satisfy the query. However, each AMP 110A-E has a limited pool of worker tasks. Hence, only a limited number of full file scans can take place at any time and therefore only a limited number of SQL statements generated by the Selector function 202 can take place at any time.

The synchronous scan feature of the RDBMS 106 allows multiple worker tasks to share the same read activity. If two tasks are scanning the same table in the relational database the same time, then the RDBMS 106 is only going to perform the scan once. If one of the tasks starts the scan earlier than the other one, the second task starts reading wherever the first task happens to be. When the scan reaches the end of the table, the first task is completed, but the second task starts the scan again at the beginning of the table, in order to pick up whatever it missed in the first pass. Because the queries generated by the Selector function 202 will tend to scan many of the same tables in the relational database, it is an overall performance improvement if all of the queries can run at the same time in order to minimize the total amount of disk scanning necessary to complete all of the SQL statements.

After the temporary work tables have been created, the Selector function 202 filters and combines the temporary work tables, yielding output tables corresponding to the inputs for the NPV/FV Calculations 208. These output tables include the partitions for the Rule 206, wherein the partitions represent the target accounts, amounts or rates against which the Rules 206 are applied. The output tables are then processed by one or more of the NPV/FV Calculations 208 in the LTV Calculation Engine 104 to accomplish a final result.

Logic of the Life-Time Value System

Figure 3:
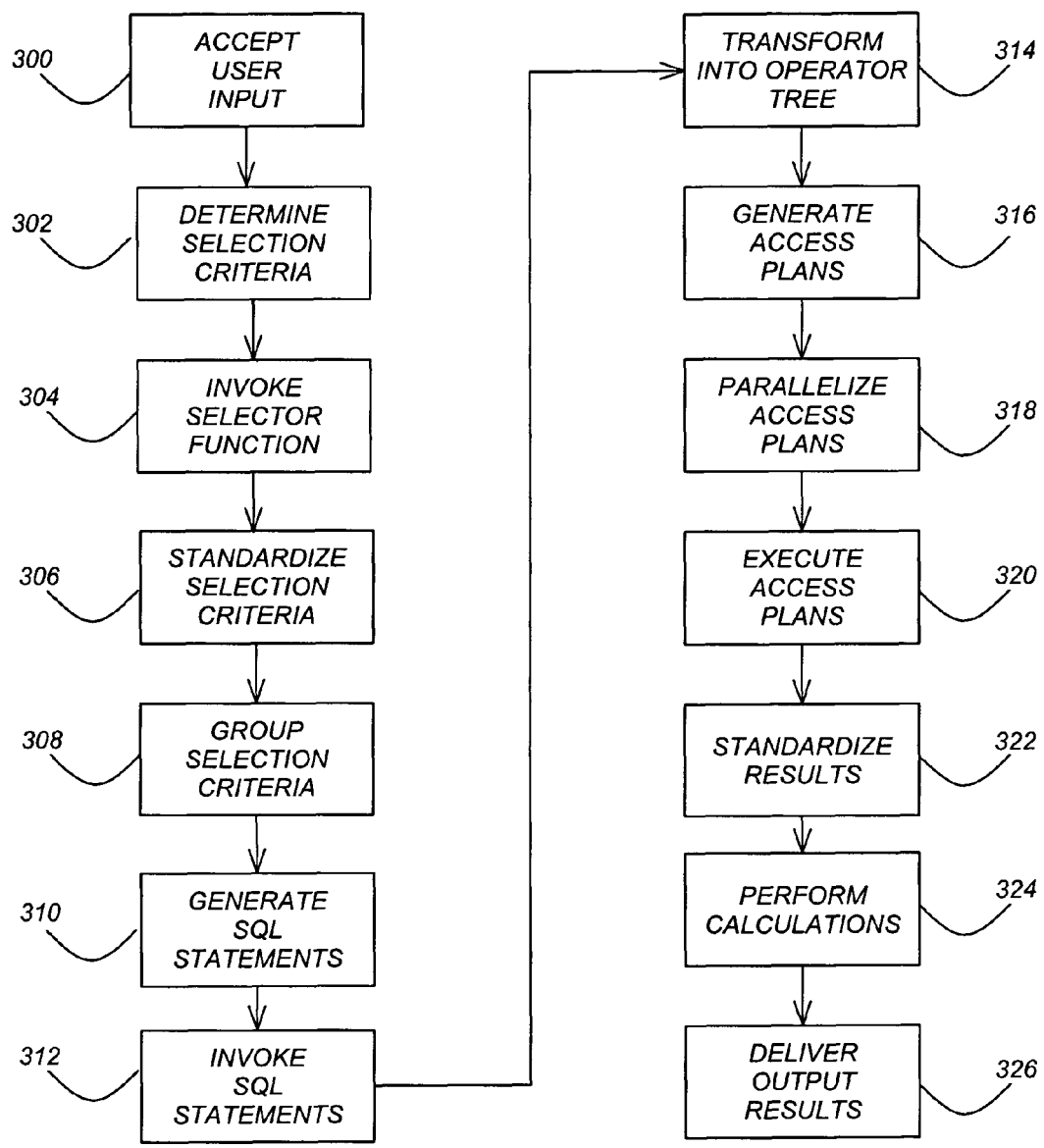
FIG. 3 is a flow chart that illustrates the logic of the Life-Time Value system according to the preferred embodiment of the present invention.

FIG. 3 is a flow chart illustrating the logic of the preferred embodiment of the present invention. Those skilled in the art will recognize that this logic is provided for illustrative purposes only and that different logic may be used to accomplish the same results.

Block 300 represents the LTV Client 102 accepting user input from the user, which may include selection criteria for accounts, amounts or rates, as well as other data.

Block 302 represents the LTV Calculation Engine 104 determining the selection criteria from the user input or the Rules 206.

Block 304 represents the LTV Calculation Engine 104 invoking the Selector function 202 for selecting accounts, amounts or rates, as well as other data from the relational database via the RDBMS 106.

Block 306 represents the Selector function 202 standardizing the selection criteria.

Block 308 represents the Selector function 202 grouping the standardized selection criteria, so that the grouped selection criteria, which comprise similar selection criteria, are processed independently and in parallel. The selection criteria are grouped when the selection criteria are applied to a same level of accounts, amounts or rates, as well as other data, when the selection criteria are of a same type, or when the selection criteria access identical attributes, or when the selection criteria access identical tables.

Block 310 represents the Selector function 202 dynamically generating SQL statements for the selected accounts, amounts or rates, as well as other data based on the specified selection criteria, wherein the SQL statements are optimized for processing by the RDBMS 106. Preferably, the SQL statements are optimized to satisfy the selection criteria using as few of the SQL statements as possible, and so that the SQL statements are executed in parallel by the RDBMS 106.

Block 312 represents the Selector function 202 invoking the dynamically generated SQL statements as SQL macros performed within the RDBMS 106, in order to perform the selection of the accounts, amounts or rates, as well as other data. Preferably, the SQL macros are grouped together for execution in parallel by the RDBMS 106. Moreover, the SQL macros are executed in a correct order by nesting the SQL macros and grouping the nested SQL macros into a high-level control macro.

Block 314 represents the Parsing Engine 108 of the RDBMS 106 transforming the SQL statements into an operator tree.

Block 316 represents the Parsing Engine 108 of the RDBMS 106 generating one or more access plans from the operator tree.

Block 318 represents the Parsing Engine 108 of the RDBMS 106 parallelizing the access plans, and then transmitting the access plans to their assigned Access Module Processors 110A-E of the RDBMS 106.

Block 320 represents the Access Module Processors 110A-E of the RDBMS 106 executing the access plans, and thereby performing the required data manipulation associated with the access plans received from the Parsing Engine 108, wherein the required data manipulation associated with the access plans are performed in parallel by the Access Module Processors 110A-E.

Block 322 represents the Parsing Engine 108 of the RDBMS 106 standardizing the results received from the Access Module Processors 110A-E and providing the standardized results to the LTV Calculation Engine 104 as NPV/FV data 204, Forecast Amounts 210, Attrition Rates 212 and Propensity rates 214.

Block 324 represents the LTV Calculation Engine 104 invoking and performing the NPV/FV Calculations 208 using the NPV/FV data 204, Forecast Amounts 210, Attrition Rates 212 and Propensity Rates 214, as well as one or more Rules 206.

Block 326 represents the LTV Calculation Engine 104 delivering the NPV/FV results 216 from the NPV/FV Calculations 208 to the LTV Client 102 and/or some other system, such as the RDBMS 106. With regard to the LTV Client 102, the results may be presented to the user, printed, or used by various other computer programs, as desired. With regard to the RDBMS 106 or other system, the results may be stored for later use by the LTV Client 102, the LTV Calculation Engine 104, or other computer programs, as desired.

CONCLUSION

This concludes the description of the preferred embodiment of the invention. The following paragraphs describe some alternative embodiments for accomplishing the same invention.

In one alternative embodiment, any type of computer or configuration of computers could be used to implement the present invention. In addition, any database management system, decision support system, on-line analytic processing system, or other computer program that performs similar functions could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing financial processing in one or more computers, comprising:
    (a) selecting, in the one or more computers, accounts, forecast amounts, and attrition and propensity rates from a database through parallel processing of a selector function, wherein the selector function uses selection criteria specified by rules to select the accounts, forecast amounts, and attrition and propensity rates from the database, the selector function dynamically generates Structured Query Language (SQL) statements using the selection criteria, the selection criteria are grouped in order to combine them in the dynamically generated SQL statements, and the grouped selection criteria are processed independently and in parallel to yield output tables comprising the accounts, forecast amounts, and attrition and propensity rates selected from the database;
    (b) performing, in the one or more computers, one or more Net Present Value (NPV) and Future Value (FV) calculations on the selected accounts using the selected forecast amounts and attrition and propensity rates, wherein results from the NPV and FV calculations are integrated to provide a Life-Time Value (LTV) of one or more customers for presentation to a user; and
    (c) providing, by the one or more computers, the LTV to the user.

2. The method of claim 1, wherein the NPV is a net present profitability value.

3. The method of claim 1, wherein the FV is a possible future profitability value.

4. The method of claim 1, wherein the accounts comprise current profitability values of accounts for the customers.

5. The method of claim 1, wherein the NPV and FV calculations are based on the rules.

6. The method of claim 1, wherein the grouped selection criteria comprise similar selection criteria.

7. The method of claim 1, wherein the statements are generated from one or more object-oriented parameterized templates.

8. The method of claim 1, wherein the statements are optimized so that the statements are executed in parallel by the database management system.

9. The method of claim 1, wherein the statements include one or more macros.

10. A system for performing financial processing by one or more computers comprising:
    (a) the one or more computers configured to select accounts, forecast amounts, and attrition and propensity rates from a database through parallel processing of a selector function, wherein the selector function uses selection criteria specified by rules to select the accounts, forecast amounts, and attrition and propensity rates from the database, the selector function dynamically generates Structured Query Language (SQL) statements using the selection criteria, the selection criteria are grouped in order to combine them in the dynamically generated SQL statements, and the grouped selection criteria are processed independently and in parallel to yield output tables comprising the accounts, forecast amounts, and attrition and propensity rates selected from the database;
    (b) the one or more computers configured to perform, one or more Net Present Value (NPV) and Future Value (FV) calculations on the selected accounts using the selected forecast amounts and attrition and propensity rates, wherein results from the NPV and FV calculations are integrated to provide a Life-Time Value (LTV) of one or more customers for presentation to a use; and (c) the one or more computers configured to provide the LTV to the user.

11. The system of claim 10, wherein the NPV is a net present profitability value.

12. The system of claim 10, wherein the FV is a possible future profitability value.

13. The system of claim 10, wherein the accounts comprise current profitability values of accounts for the customers.

14. The system of claim 10, wherein the NPV and FV calculations are based on the rules.

15. The system of claim 10, wherein the grouped selection criteria comprise similar selection criteria.

16. The system of claim 10, wherein the statements are generated from one or more object-oriented parameterized templates.

17. The system of claim 10, wherein the statements are optimized so that the statements are executed in parallel by the database management system.

18. The system of claim 10, wherein the statements include one or more macros.

19. An article of manufacture embodying instructions that, when read and executed by one or more computers, results in the one or more computers performing a method of financial processing, the method comprising:

(a) selecting, in the one or more computers, accounts, forecast amounts, and attrition and propensity rates from a database through parallel processing of a selector function, wherein the selector function uses selection criteria specified by rules to select the accounts, forecast amounts, and attrition and propensity rates from the database, the selector function dynamically generates Structured Query Language (SQL) statements using the selection criteria, the selection criteria are grouped in order to combine them in the dynamically generated SQL statements, and the grouped selection criteria are processed independently and in parallel to yield output tables comprising the accounts, forecast amounts, and attrition and propensity rates selected from the database;

(b) performing, in the one or more computers, one or more Net Present Value (NPV) and Future Value (FV) calculations on the selected accounts using the selected forecast amounts and attrition and propensity rates, wherein results from the NPV and FV calculations are integrated to provide a Life-Time Value (LTV) of one or more customers for presentation to a user; and (c) providing, by the one or more computers, the LTV to the user.

20. The article of claim 19, wherein the NPV is a net present profitability value.

21. The article of claim 19, wherein the FV is a possible future profitability value.

22. The article of claim 19, wherein the accounts comprise current profitability values of accounts for the customers.

23. The article of claim 19, wherein the NPV and FV calculations are based on the rules.

24. The article of claim 19, wherein the grouped selection criteria comprise similar selection criteria.

25. The article of claim 19, wherein the statements are generated from one or more object-oriented parameterized templates.

26. The article of claim 19, wherein the statements are optimized so that the statements are executed in parallel by the database management system.

27. The article of claim 19, wherein the statements include one or more macros.

\* \* \* \* \*